US011070255B2

(12) United States Patent
Notargiacomo et al.

(10) Patent No.: US 11,070,255 B2
(45) Date of Patent: Jul. 20, 2021

(54) WIRELESS COMMUNICATION SYSTEM AND RELATED METHOD FOR PROCESSING UPLINK FRONTHAUL DATA

(71) Applicant: TEKO TELECOM S.R.L., Castel San Pietro Terme (IT)

(72) Inventors: Massimo Notargiacomo, Castel San Pietro Terme (IT); Giulio Gabelli, Castel San Pietro Terme (IT); Fabrizio Marchese, Castel San Pietro Terme (IT); Alessandro Pagani, Castel San Pietro Terme (IT); Davide Durante, Castel San Pietro Terme (IT); Lorenzo Minghini, Castel San Pietro Terme (IT)

(73) Assignee: TEKO TELECOM S.R.L., Castel San Pietro Terme (IT)

( * ) Notice: Subject to any disclaimer, the term of this patent is extended or adjusted under 35 U.S.C. 154(b) by 0 days.

(21) Appl. No.: 16/615,769

(22) PCT Filed: May 22, 2018

(86) PCT No.: PCT/IB2018/053614
§ 371 (c)(1),
(2) Date: Nov. 21, 2019

(87) PCT Pub. No.: WO2018/215932
PCT Pub. Date: Nov. 29, 2018

(65) Prior Publication Data
US 2020/0162131 A1 May 21, 2020

(30) Foreign Application Priority Data
May 22, 2017 (IT) .......................... 102017000055080

(51) Int. Cl.
*H04B 7/024* (2017.01)
*H04B 7/08* (2006.01)

(52) U.S. Cl.
CPC ........... *H04B 7/024* (2013.01); *H04B 7/0842* (2013.01); *H04B 7/0865* (2013.01)

(58) Field of Classification Search
None
See application file for complete search history.

(56) References Cited

U.S. PATENT DOCUMENTS 9,414,399 B2 * 8/2016 Eyuboglu ............. H04L 5/0023
10,541,734 B2 * 1/2020 Delfeld ............... H04L 25/0222
(Continued)

FOREIGN PATENT DOCUMENTS

AU     2015249965 A1 * 11/2016 ............. E01F 9/654
CN     110651432 A   * 1/2020 ........... H04B 7/0842
(Continued)

*Primary Examiner* — Berhanu Tadese
(74) *Attorney, Agent, or Firm* — David B. Tingey; Bryant J. Keller; Kirton McConkie

(57) ABSTRACT

The wireless communications system comprises: a plurality of remote units, wherein each remote unit is configured to convert a respective RF signal into a plurality of time and frequency samples, perform a noise estimation corresponding to the plurality of time and frequency samples, compute a plurality of coefficients corresponding to the plurality of time and frequency samples that have an amplitude greater than at least a predefined threshold value, and multiply each of the plurality of coefficients by its corresponding time and frequency sample to create a plurality of weighted time and frequency samples; at least an intelligent switching unit, coupled to the plurality of remote units, wherein the intelligent switching unit is configured to receive the plurality of weighted time and frequency samples from each of the plurality of remote units, temporally align the pluralities of weighted time and frequency samples, compute a set of weighted sums of time and frequency samples and transmit the set of weighted sums of time and frequency samples; and a baseband processing unit coupled to the intelligent switch- (Continued)

ing unit and configured to receive the set of weighted sums of time and frequency samples, and compute a remaining portion of baseband protocol stack processing on the set of weighted sums of time and frequency samples.

18 Claims, 6 Drawing Sheets

(56) References Cited

U.S. PATENT DOCUMENTS

| | | | | |
|---|---|---|---|---|
| 2005/0287978 | A1* | 12/2005 | Maltsev | H04B 7/066 455/403 |
| 2008/0186878 | A1* | 8/2008 | Zheng | H04W 88/085 370/254 |
| 2009/0316611 | A1* | 12/2009 | Stratford | H04L 27/2656 370/294 |
| 2012/0033598 | A1* | 2/2012 | Colban | H04L 1/0083 370/312 |
| 2012/0063294 | A1* | 3/2012 | Osterling | H04W 56/0045 370/210 |
| 2012/0281638 | A1* | 11/2012 | Ly-Gagnon | H04W 8/005 370/329 |
| 2013/0279437 | A1* | 10/2013 | Ng | H04L 25/0224 370/329 |
| 2014/0024402 | A1* | 1/2014 | Singh | H04B 17/23 455/501 |
| 2014/0098690 | A1* | 4/2014 | Siomina | H04B 17/309 370/252 |
| 2014/0119266 | A1* | 5/2014 | Ng | H04L 27/2602 370/312 |
| 2014/0219255 | A1 | 8/2014 | Eyuboglu et al. | |
| 2015/0249965 | A1* | 9/2015 | Dussmann | H04W 52/243 455/501 |
| 2016/0057708 | A1* | 2/2016 | Siomina | H04W 72/1263 455/452.2 |
| 2016/0183243 | A1* | 6/2016 | Park | H04W 72/0453 370/329 |
| 2017/0070994 | A1* | 3/2017 | Rico Alvarino | H04L 5/0048 |
| 2017/0126339 | A1* | 5/2017 | Skarby | H04B 7/04 |
| 2017/0149464 | A1* | 5/2017 | Notargiacomo | H04B 1/1036 |
| 2019/0036577 | A1* | 1/2019 | Delfeld | H04L 25/0222 |
| 2019/0297631 | A1* | 9/2019 | Fu | H04L 5/006 |
| 2020/0162131 | A1* | 5/2020 | Notargiacomo | H04B 7/0842 |

FOREIGN PATENT DOCUMENTS

| | | | | |
|---|---|---|---|---|
| IT | 201700055080 A1 * | 11/2018 | | H04B 7/0842 |
| WO | WO-2014024402 A1 * | 2/2014 | | H02P 27/08 |
| WO | 2016/141120 A1 | 9/2016 | | |
| WO | WO-2016141120 A1 * | 9/2016 | | H04B 17/14 |
| WO | WO-2017126339 A1 * | 7/2017 | | G01D 5/24447 |
| WO | WO-2018215932 A1 * | 11/2018 | | H04B 7/04 |

* cited by examiner

WIRELESS COMMUNICATION SYSTEM AND RELATED METHOD FOR PROCESSING UPLINK FRONTHAUL DATA

TECHNICAL FIELD

The present invention relates to a wireless communication system and to a related method for processing uplink fronthaul data.

BACKGROUND ART

In the field of telecommunications and with reference to today's small-medium in-building and mini metropolitan areas, it is known that cellular DAS (Distributed Antenna System) deployment is limited due to its no-cost effectiveness.

In fact, depending on the number of bands and operators, and on the size of the area to cover, a lighter solution, e.g. small-cell, might be a better choice in terms of both footprint and cost.

However, the limitation of small-cells-like solution is clear in scenarios where it is needed to provide multi-operator and multi-band coverage, because each small-cell usually works for a single operator in a single band at once, so their number tends to rise rapidly.

Moreover, each small-cell would furtherly require a powering cable and, last but not least, in a standard deployment it is not even possible to serve the same sector through different small-cells.

Thanks to the transition from hardware to virtual Radio Access Network (RAN) it is possible to overcome the abovementioned problems thanks to a physical layer splitting allowed by the 3GPP LTE standard and the development of solution-aware virtual Base Band Units (BBUs).

DISCLOSURE OF THE INVENTION

The main aim of the present invention is to provide a wireless communication system and a related method for processing uplink fronthaul data which can be used in small-medium sized buildings and mini metropolitan areas as an alternative to small-cell solutions.

In general, the present invention is related to distributed cells design fed by virtual BBUs and connected through digital links.

Further aims of the present invention are to provide a wireless communication system and a related method for processing uplink fronthaul data which have the following main advantages with respect to the known solutions:
   easy one-cable plug and play installation;
   possibility to choose the desired type of connection (10 Gbps SFP+, direct attach, or Base-T) and powering mode (PoE or DC);
   cost reduction with respect to a typical DAS deployment in these scenarios, in both CAPEX and OPEX;
   dynamic and agile capacity management;
   performance boost and efficiency with respect to small-cells (interference reduction, cooperation techniques, higher modulation orders, multi-band, multi-operator, MIMO, etc.);
   introduction of 5G's Next generation Fronthaul Interface (NGFI) paradigm, i.e., the LTE stack splitting on the fronthaul;
   location-based services;
   uplink noise reduction.

The above mentioned objects are achieved by the present wireless communication system according to the features of claim 1.

BRIEF DESCRIPTION OF THE DRAWINGS

Other characteristics and advantages of the present invention will become better evident from the description of a preferred, but not exclusive embodiment of a wireless communication system and of a related method for processing uplink fronthaul data, illustrated by way of an indicative but non-limiting example in the accompanying Figures, in which.

WAYS OF CARRYING OUT THE INVENTION

Figure 1:
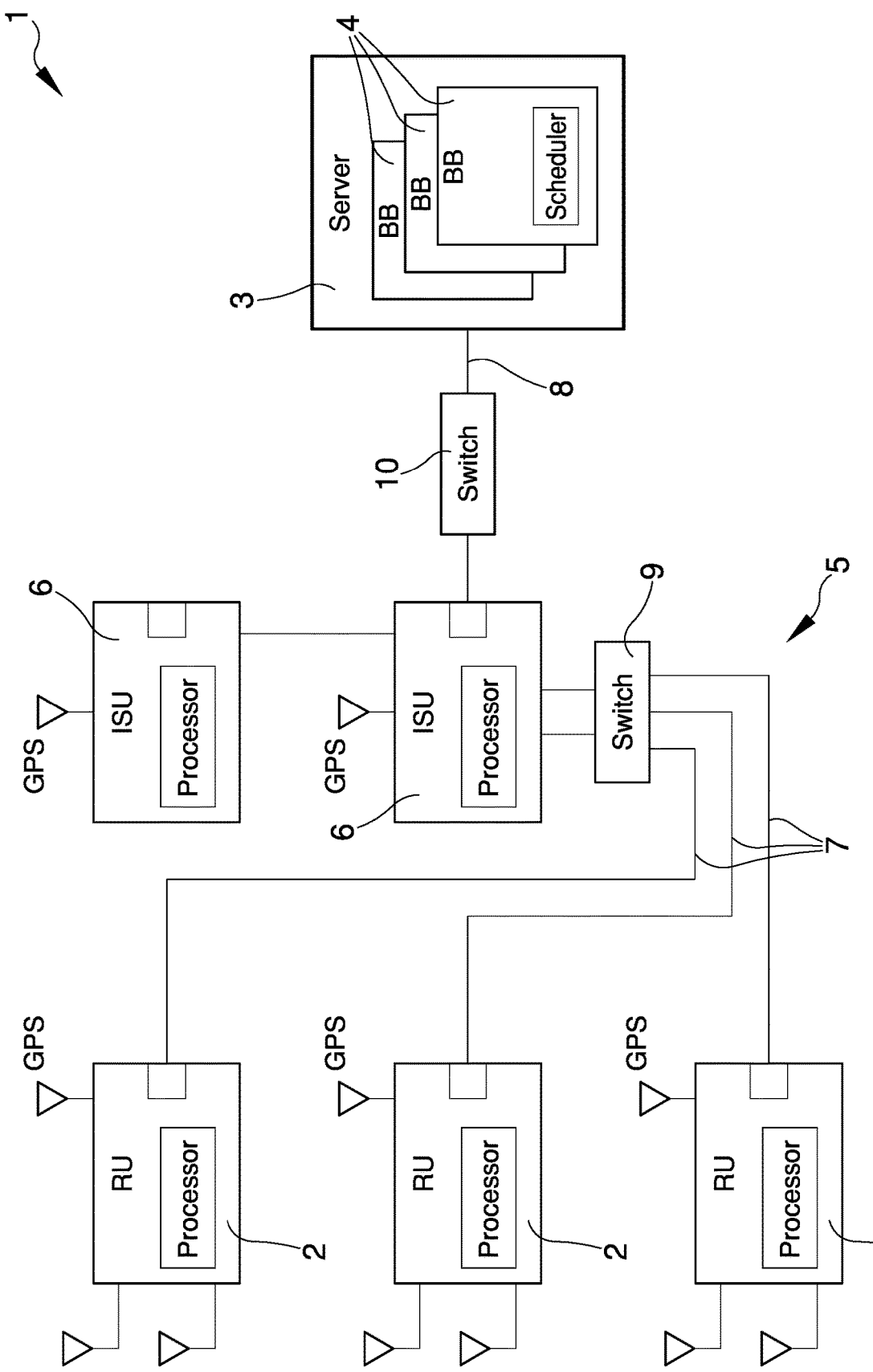
FIG. 1 shows a possible embodiment of the wireless communication system according to the invention.

The wireless communications system according to the invention is showed in FIG. 1, wherein the system is globally indicated with reference 1.

As schematically showed in FIG. 1, the wireless communication system 1 comprises:
   a plurality of remote units 2 (RUs);
   a baseband processing unit 3 implemented by multiple base station baseband software instances 4 (BBU pool) running on a general-purpose hardware;
   a fronthaul digital network 5 connecting the BBU pool 4 and the remote units 2.

The fronthaul digital network 5 transports downlink (DL) and uplink (UL) antenna-carrier streams, control and synchronization signalling.

A possible embodiment of the wireless communication system 1 is detailed below.

Particularly, the fronthaul digital network 5 of the wireless communications system 1 comprises at least an intelligent switching unit 6, connected to the plurality of remote units 2.

With reference to a possible embodiment schematically showed in FIG. 1, the fronthaul digital network 5 comprises a plurality of first Ethernet connections 7 connecting the plurality of remote units 2 and the intelligent switching unit 6, and at least a second Ethernet connection 8 connecting the intelligent switching unit 6 and the baseband processing unit 3.

For example, the first Ethernet connection 7 and the second Ethernet connection 8 can be implemented by 10 GbE BaseT links.

However, different solution are not excluded.

For example, possible different embodiments of the fronthaul digital network 5 comprises:
   direct connection from the baseband processing unit 3 to the remote units 2 via Ethernet connection or optical link;

optical connection from the baseband processing unit 3 to the intelligent switching unit 6 and Ethernet connection (via BaseT cable) from the intelligent switching unit 6 to the remote units 2;

optical connection from the baseband processing unit 3 to the intelligent switching unit 6 and Ethernet connection (via BaseT cable) from the intelligent switching unit 6 to the remote unit 2, but with the addition of classical network switches between the intelligent switching unit 6 and the remote units 2;

all of the above with a COTS Midspan PoE before entering the remote units 2.

With reference to the use of an Ethernet connection and according to the possible embodiment showed in FIG. 1, the fronthaul digital network 5 comprises at least a first Ethernet switch 9 disposed between the plurality of remote units 2 and the intelligent switching unit 6.

Furthermore, the fronthaul digital network 5 comprises at least a second Ethernet switch 10 disposed between the intelligent switching unit 6 and the baseband processing unit 3.

However, the use of the first Ethernet switch 9 and of the second Ethernet switch 10 is optional.

It is also pointed out that, as showed in the example of FIG. 1, the fronthaul digital network 5 can comprise a plurality of intelligent switching units 6, wherein each of the plurality of intelligent switching units 6 is coupled to a respective plurality of remote units 2.

Furthermore, the intelligent switching unit 6 is further configured to synchronize itself with the plurality of remote units 2, with other intelligent switching units 6 eventually connected, and with the plurality of baseband processing unit 3.

Particularly, the intelligent switching unit 6 can be configured to synchronize itself with the plurality of remote units 2 or with the plurality of baseband processing unit 3 by using synchronous protocols selected from the group consisting of:

Synchronous Ethernet, PTP, and NTP. However, the use of different synchronous protocols is not excluded.

Therefore, it is possible to connect several intelligent switching units 6 either among them or to the baseband processing unit 3 in many different configurations, so to forward the traffic from one intelligent switching unit 6 to another or to deploy redundant architectures on the fronthaul digital network 5.

Figure 2:
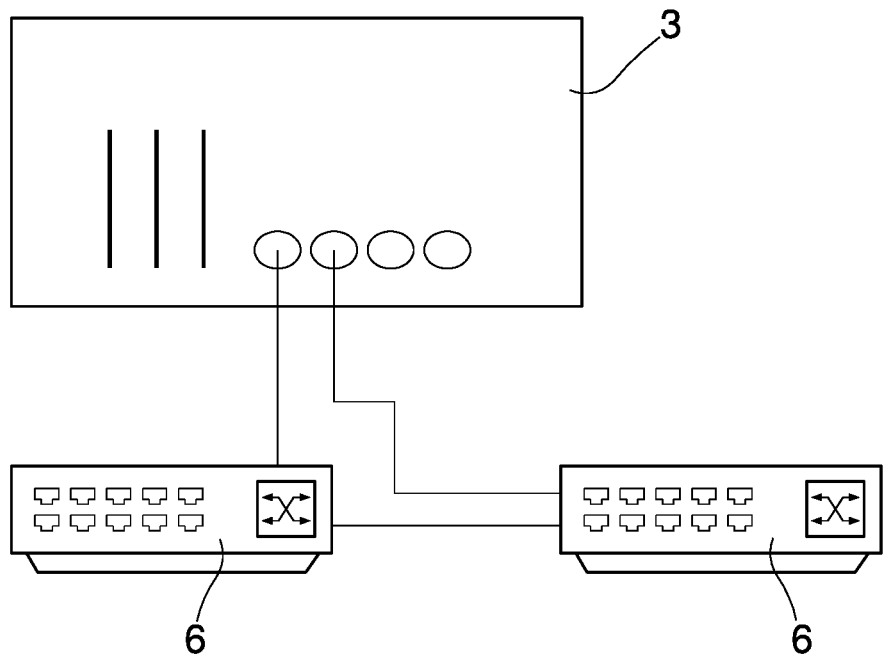
FIGS. 2 and 3 show examples of possible intelligent switching units 6 connections.
Figure 3:
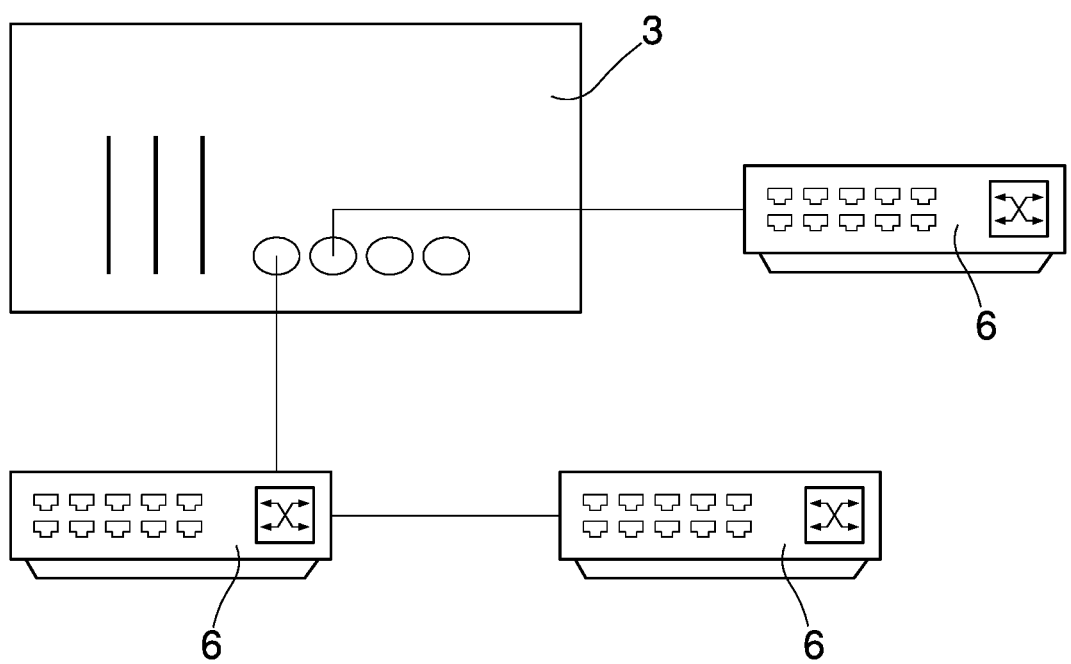

In FIGS. 2 and 3 are showed examples of possible intelligent switching units 6 connections.

In the example of FIG. 2 is depicted a redundant architecture (with no theoretical limit on the number of intelligent switching units 6), wherein two intelligent switching units 6 are both connected to the PCIe card installed into the server implementing the baseband processing unit 3, and wherein the two intelligent switching unit 6 are linked together.

In this way, the fronthaul digital network 5 has at least a backup link in the connection between the intelligent switching units 6 and the baseband processing unit 3.

In the example of FIG. 3, the data is forwarded among intelligent switching units 6 through independent fronthaul links.

All the architectures offer the flexibility to deploy a robust network while pushing the system efficiency to the highest level possible.

Eventually, the intelligent switching unit 6 can be integrated into one or more of the plurality of remote units 2.

Furthermore, the intelligent switching unit 6 can be further configured to transmit a Power over Ethernet (PoE) signal to each of the plurality of remote units 2.

Therefore, it is possible to send the control and data traffic via a standard CAT-X cable while injecting the power supply for the remote units 2 on the same cable.

The intelligent switching unit 6 can be also configured to perform the following functions:

packet switching for control signals;

for downlink, antenna-carrier traffic forwarding in an unicast, multicast or broadcast scheme;

change the routing at run-time, thus allowing to select the path of the antenna-carrier between the central baseband machine and the remote units (sometimes referred to "capacity orchestration").

With reference to LTE (Long Term Evolution) standards, a further enhancement can be done through the splitting of the LTE stack, thus permitting to have a data flow on the fronthaul digital network 5 proportional to the actual data to transmit. As known, The 3GPP standard defines eight main splitting levels, thus allowing eight different LTE stack splitting options.

The chosen splitting option directly affects the set of features as well as the complexity of the overall system.

However, the wireless communication system 1 according to the invention does not depend on a specific splitting option.

On the downlink, the control and data signals flow from the dedicated server 3, where the BBU pool instances 4 are hosted, towards the intelligent switching unit 6 via a dedicated connection, for example 10 Gbps connection.

All the data is encapsulated into Ethernet packets, and the intelligent switching unit 6 forwards the packets in a unicast, multicast, or broadcast fashion as configured in the system management software that supervisions the system. Therefore, it is possible to route the traffic as desired and with on-the-fly configuration.

The control and management signals are encapsulated into Ethernet packets sharing the same physical layer of control and data signals coming from the baseband processing unit 3, nevertheless this won't affect the performances due to the negligible information that needs to be transported.

The wireless communications system 1 comprises a baseband processing unit 3 coupled to the intelligent switching unit 6.

According to a preferred embodiment, the baseband processing unit 3 is implemented by a general-purpose server which runs a fully-software Baseband Unit BBU pool 4 that process the baseband signal belonging to a particular standard (e.g., 4G).

The server, and then the BBU pool 4, is directly or indirectly connected on one side to the operator's backhaul via an existing network, which can be either dedicated or shared; while on the other it is connected to the fronthaul digital network 5.

The BBU software instances 4 communicates with the fronthaul digital network 5 through a dedicated electronic card that uses a standard interface (e.g., PCIe), which might integrate different kind of physical interfaces. In fact, the connections exploit digital links that can use, for example, 10 Gbps SFP+, direct attach, or Base-T connections.

Furthermore, compression algorithms may be used in order to optimize the effective data rate flowing towards the remote units 2 without compromising the signal quality.

With reference to the specific embodiment of FIG. 1, both the remote units 2 and the intelligent switching units 6 are provided with respective GPS position systems.

However, different embodiments are not excluded.

Particularly, at least one of the intelligent switching units 6 should comprise a GPS system (or similar).

The GPS position systems on the remote units 2 are optional.

The uplink processing by the wireless communication system 1 according to the invention is detailed below.

On the uplink, the wireless communication system 1 according to the invention introduces advanced features in order to optimize the current known solutions.

In fact, it is possible to limit the needed bandwidth on the fronthaul digital network 5 thus permitting to use lower bitrates medium and limit the needed capacity.

The first optimization is obtained limiting the number of uplink SC-FDMA subcarriers to be forwarded to the baseband processing unit 3 thanks to the use of a detection threshold at the remote units 2.

This solution introduces two main benefits:
- transmit independently on the uplink only the actual used subcarriers;
- canceling the uplink noise contribution of unused subcarriers at each remote unit 2.

Figure 4:
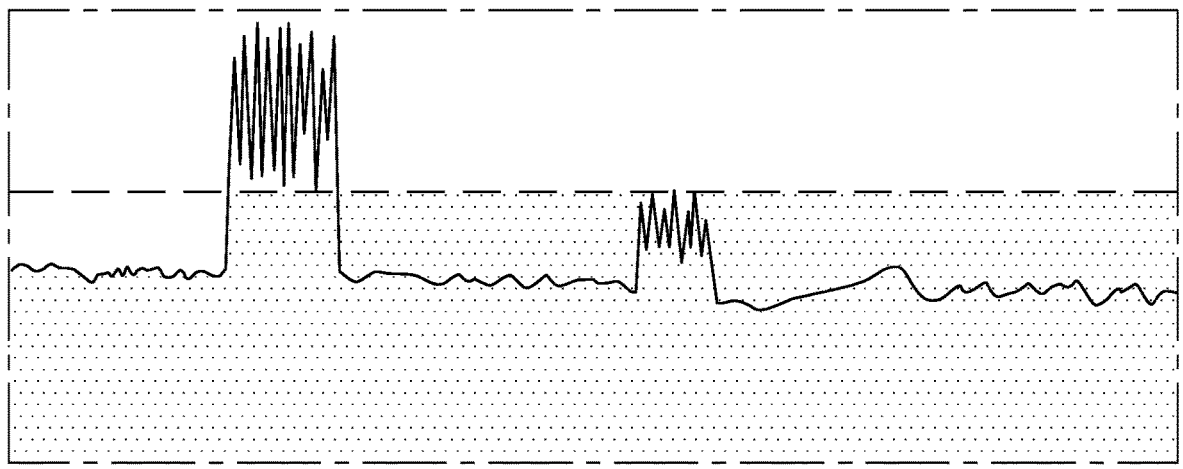
FIGS. 4 and 5 show an uplink squelch example (in the frequency domain)
Figure 5:
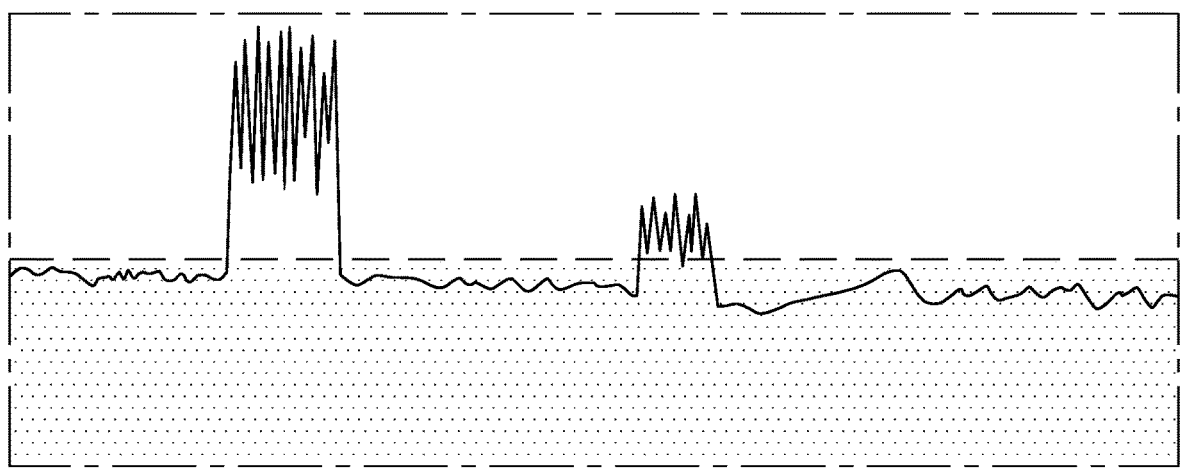

As showed in the example of FIGS. 4 and 5, the use of a power threshold in the uplink signal spectrum limits the number of subcarriers to transmit on the uplink (and so the uplink bitrate), choosing the ones with the highest power while limiting the noise contribution of unused subcarriers at the same time.

The detected uplink subcarriers are sent to the BBU pool 4 through the fronthaul digital network 5 sharing the same medium used for the downlink.

Particularly, for uplink transmission, both the remote unit 2 the intelligent switching unit 6 can be configured to set a squelch power threshold in the frequency domain, thus limiting the number of subcarriers to the ones actually being used (i.e., which have a power higher than a desired value).

In that case, since each remote unit 2 sends only uplink samples of detected subcarriers, the noise contribution for the subcarriers at which no traffic is detected is null, thus the NF is strongly reduced.

Furthermore, the intelligent switching unit 6 can merge the uplink RF streams coming from different remote units 2 serving the same sector with different techniques, so to rise the Signal to Noise Ratio (SNR) while reducing the fronthaul traffic on the uplink.

For example, multiple uplink carrier streams coming from different remote units 2 can be combined by the intelligent switching unit 6 by means of:
- direct sum of synchronized uplink streams belonging to the same carrier;
- weighted sum of synchronized uplink streams belonging to the same carrier as a function of their SINR (Maximum Ratio Combining approach). The SNR estimation can be done directly at the remote units 2;
- coherent sum (amplitude and phase) of synchronized uplink streams belonging to the same carrier (this will allow to improve the SNR);
- possibility to assign a certain number of uplink subcarriers to certain remote units, thus prioritizing hotspots capacity without saturating the fronthaul traffic.

The same uplink signal-merging methods might also be integrated into the PCIe card of the server implementing the baseband processing unit 3 depending on the deployed architecture.

Thanks to these approaches it becomes possible to largely reduce the required bandwidth and so the cost of the underlying network and hardware.

Another feature that can be implemented in the wireless communication system 1 according to the invention is the uplink subcarriers prioritization in case of fronthaul network congestion.

In fact, when the fronthaul digital network 5 is congested (e.g., other systems share the same cable infrastructure) some remote units 2 may be assigned with a higher priority (and so higher capacity) so that they can exclusively use a defined set of uplink subcarriers.

At the same time, the wireless communication system 1 avoid the transmission of these abovementioned subcarriers from other remote units 2 on the same uplink path, keeping only some different ones that are needed to cover that specific location.

Several algorithms may be adopted to perform this operation, enabled either by automatic procedures or by manual intervention via the system management tool.

Clearly, this can be seen as one of the Self Organizing Network (SON) features that will be widely adopted in the next generation 5G systems.

Particularly, with reference to a preferred embodiment, the wireless communications system 1 comprises a plurality of remote units 2, wherein each remote unit 2 is configured to:
- convert a respective RF signal into a plurality of time and frequency samples;
- perform a noise estimation corresponding to the plurality of time and frequency samples;
- compute a plurality of coefficients corresponding to the plurality of time and frequency samples that have an amplitude greater than a threshold value, and
- multiply each of the plurality of coefficients by its corresponding time and frequency sample to create a plurality of weighted time and frequency samples.

According to a preferred embodiment, the conversion of a respective RF signal into a plurality of time and frequency samples is carried out by performing a Fast Fourier Transform in accordance with a Layer 1 LTE process.

Furthermore each remote unit 2 can be configured to calculate one of the following:
- a phase shift corresponding to each of said plurality of time and frequency samples;
- a frequency shift corresponding to each of said plurality of time and frequency samples;
- a time delay corresponding to each of said plurality of time and frequency samples.

Furthermore, each remote unit 2 can be configured to provide a time stamp corresponding to its plurality of time and frequency samples.

The intelligent switching unit 6 is configured to:
- receive the plurality of weighted time and frequency samples from each of the plurality of remote units 2,
- temporally align the pluralities of weighted time and frequency samples;
- compute a set of weighted sums of time and frequency samples and transmit the set of weighted sums of time and frequency samples.

According to possible embodiment, the intelligent switching unit 6 can be configured to calculate at least one of the following:
- a phase shift corresponding to each of the plurality of time and frequency samples;
- a frequency shift corresponding to each of the plurality of time and frequency samples; and a time delay corresponding to each of the plurality of time and frequency samples.

Particularly, the calculated phase shift, frequency shift and time delay can be used to compensate the non-idealities effects due to the propagation and signal processing. In this way, it is possible to increase the SNR (Signal to Noise Ratio) when summing together different replicas of the same signal coming from various antennas.

Furthermore, the intelligent switching unit 6 is configured to:

identify a user-equipment specific plurality of weighted time and frequency samples within said pluralities of weighted time and frequency samples, corresponding to a specific user equipment;

identify a specific remote unit 2 corresponding a strongest signal within the UE-specific plurality of weighted time and frequency samples;

store a remote unit identifier corresponding to the specific remote unit 2; and store a user-equipment identifier corresponding to the specific user equipment.

It is specified that with the wording "user equipment" is intended a device of the type of a mobile phone, a PC, a tablet or an other device that is connected to the operator's network through the wireless communication system 1.

According to a possible embodiment, the intelligent switching unit 6 can be configured to relay downlink data intended for the identified specific user equipment exclusively to the identified specific remote unit 2.

Furthermore, the intelligent switching unit 6 is suitable for configuring the plurality of remote units 2 to set a bias threshold for each of the remote units 2, thereby prioritizing the plurality of weighted time and frequency samples from one or more prioritized remote units 2.

Furthermore, the baseband processing unit 3 is configured to receive the set of weighted sums of time and frequency samples, and compute a remaining portion of baseband protocol stack processing on the set of weighted sums of time and frequency samples.

Particularly, the baseband processing unit 3 is configured to:

receive the remote unit identifier and the user-equipment identifier from the intelligent switching unit 6;

correlate the remote unit identifier with a location of the remote unit 2 to determine an approximate location of the specific user equipment; and transmit the location of the specific user equipment.

The methods 100, 200, 300 according to the invention for the processing of uplink fronthaul data in a wireless communication network are detailed in the following.

Figure 6:
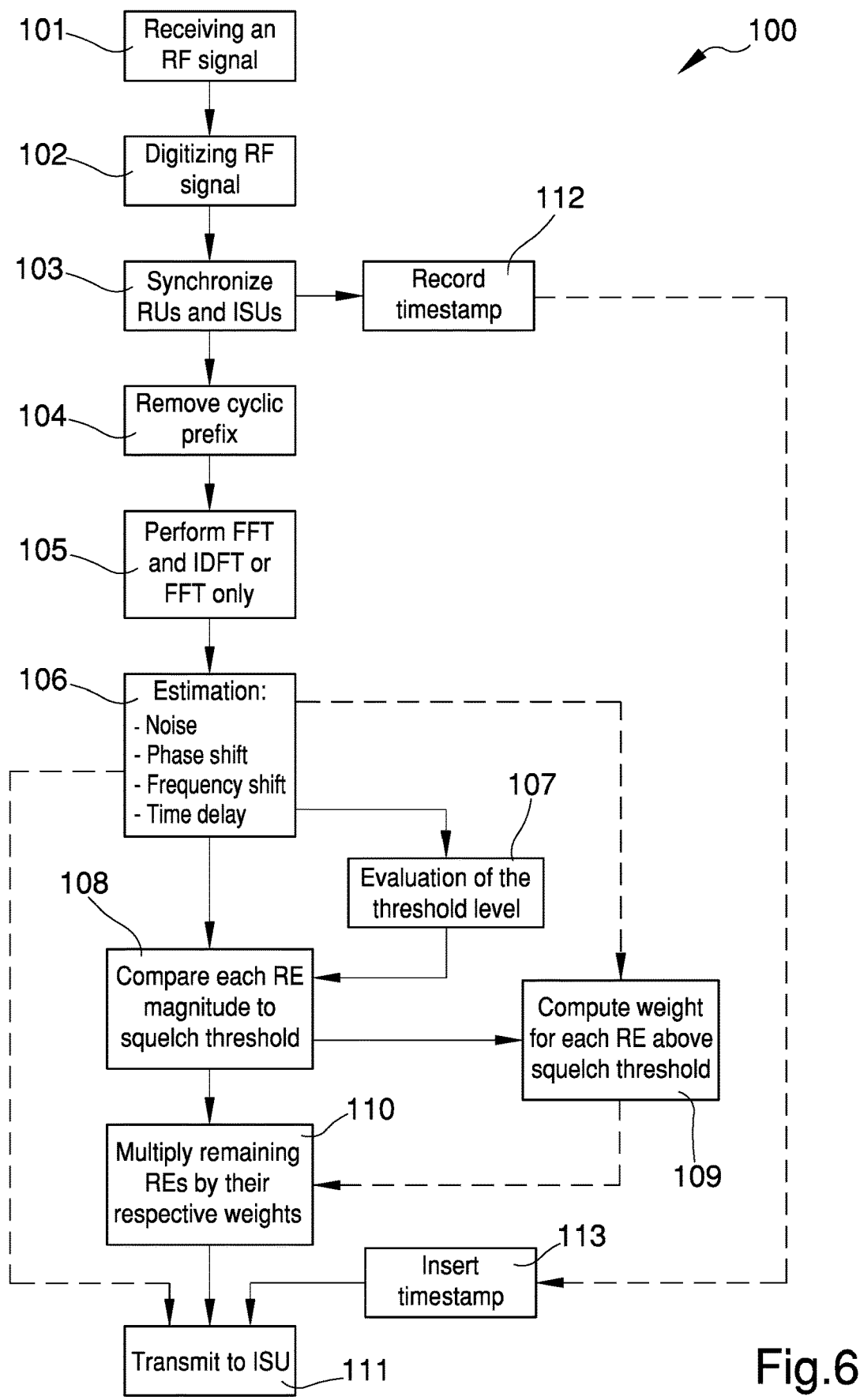
FIG. 6 is a block diagram showing a possible embodiment of a the method according to the invention for generating weighted frequency domain data sets.

Particularly, the method 100 for generating weighted frequency domain data sets starting from a received RF signal is detailed below and a possible embodiment is showed in FIG. 6.

Preferably, the method 100 disclosed below is achieved for the uplink fronthaul data and by each of the remote units 2 of the wireless communication system 1 according to the invention. However, different embodiment are not excluded wherein at least part of the steps are executed by the intelligent switching unit 6. Particularly, different solutions can be implemented depending on specific resources availability and computational complexity.

The method 100 comprises at least the following steps:

receiving an RF signal (step 101);

digitizing the RF signal into a set of digital time samples (step 102);

performing the FFT and the IDFT or the FFT only, to obtain a plurality of time or frequency domain data sets, each of the time or frequency domain data sets having a plurality of samples (step 105);

calculating channel impairments, noise, parameters estimation corresponding to the plurality of time or frequency domain data sets (step 106);

comparing an amplitude corresponding to each sample to a threshold value (step 108);

calculating a complex coefficient corresponding to each sample that has an amplitude that is greater than the threshold value (step 109);

multiplying each sample that has an amplitude that is greater than the threshold value by its corresponding coefficient to create a plurality of weighted time or frequency domain data sets having a plurality of weighted samples (step 110); and transmitting each plurality of weighted time or frequency domain data sets (111).

Particularly, the step 102 of digitizing the RF signal comprises sampling and quantizing an uplink carrier signal into a digital data stream.

Furthermore, with particular reference to the LTE standard, the samples can be grouped into a plurality of SC-FDMA data sets, each corresponding to a SC-FDMA symbol.

A Fast Fourier Transform on the SC-FDMA data stream is executed in order to generate a plurality of Resource Blocks, each of the plurality of resource blocks having a plurality of Resource Elements.

In this case, the method 100 preferably comprises a step 104 for removing Cyclic Prefix samples from each SC-FDMA data set.

Furthermore, the method 100 can comprise a step 103 of synchronization between the remote units 2 and the intelligent switching unit 6.

According to a preferred embodiment, the step 106 of calculating the noise estimation comprises the measurement of a noise level corresponding to a portion of spectrum in close proximity to an uplink carrier corresponding to the RF signal, whereby in the portion of spectrum in close proximity has substantially only noise present.

Furthermore, step 106 comprises performing data aided noise estimation after performing a partial demodulation of the uplink carrier signal.

The data aided noise estimation can be performed by means of different methods.

For example, the noise estimation can be based on the measurement of the average power of samples consisting of just noise.

Another possible example is the use of a maximum likelihood data aided noise estimation.

In this case, for example, given a received signal r(t)=s(t, alpha)+n(t), one method consists in carrying out a maximum likelihood estimate alpha_0 of the parameter alpha, and in evaluating the average energy of the difference signal d(t)=r(t)−s(t, alpha_0).

Particularly, the noise estimation can be calculated once per millisecond.

According to a preferred embodiment, the method 100 comprises a step 107 of calculating the threshold value as a function of the noise estimation and a minimum acceptable signal to noise ratio.

Particularly, the threshold value can be calculated at the same rate as calculating the noise estimation.

According to a preferred embodiment, the step 109 of calculating the coefficient comprises setting the coefficient to a constant value.

Particularly, the coefficient can be equal to 1 if the sample amplitude is greater than the threshold value or can be equal to zero if the sample amplitude is less than the threshold value.

Moreover, in a possible embodiment the threshold value can be set to a certain value (e.g., zero) either by the intelligent switching unit 6 or by the baseband processing unit 3 according to a desired pattern of priority concerning to at least one user equipment. One of the main advantages in doing this is to limit the fronthaul traffic. In fact, when the network is congested and the user equipment is served by more than one remote units 2, the intelligent switching unit 6 or the baseband processing unit 3 may decide to mute the uplink traffic from the remote units 2 with a low Signal to Interference-plus-Noise Ratio (SINR) and maintain only the one with the highest SINR.

The same technique can be used for downlink traffic with evident advantages.

Furthermore, the calculation of the coefficient comprises calculating a complex channel gain from a plurality of received pilot signals.

With particular reference to LTE standard, the gain is calculated from a plurality of Reference Signals embedded within the Resource Blocks.

Furthermore, the calculation of the coefficient eventually comprises calculating an inverse of a noise power estimation.

According to a possible embodiment, at step 106 the method 100 eventually comprises estimating one of the following impairments:
- a phase shift estimation corresponding to each of a second plurality of samples within the plurality of time and frequency samples;
- a frequency shift estimation corresponding to each of the second plurality of samples; and
- a time delay, within a period of the plurality of frequency domain data sets, corresponding to each of a second plurality of samples.

The phase shift can be calculated by performing a data-aided estimation exploiting at least one demodulation reference signal (DMRS).

Particularly, phase estimation can be performed by exploiting data-aided phase maximum likelihood phase estimation techniques, or non-data-aided techniques, like Costas loop, which are very well known in the literature.

Similarly, the frequency shift estimation can be calculated by means of data aided maximum likelihood frequency estimation schemes.

The time delay can be calculated by using data aided estimation or non-data aided techniques like the Costas loop.

Moreover, step 106 may also estimate any other property related to the incoming signal, for example the Angle of Arrival (AoA) or the Channel Impulse Response (CIR), exploiting multiple antenna techniques or super-resolution algorithms such as SAGE (Space Alternating Generalized Expectation Maximization), RiMAX (Richter's Maximum likelihood estimation), etc. In each case, the transmission of the weighted time or frequency domain data set includes transmitting the phase shift estimation, the frequency shift estimation, the time delay estimation, and any other information estimated from the incoming signal as mentioned above.

In a possible embodiment, step 106 can be totally or partially performed before step 105.

Furthermore, the method 100 can comprise a step 112 of storing a time stamp for each data set corresponding to the period during which the contained samples have been received, and a step 113 of including the time stamp in the transmission of each weighted frequency domain data set.

Figure 7:
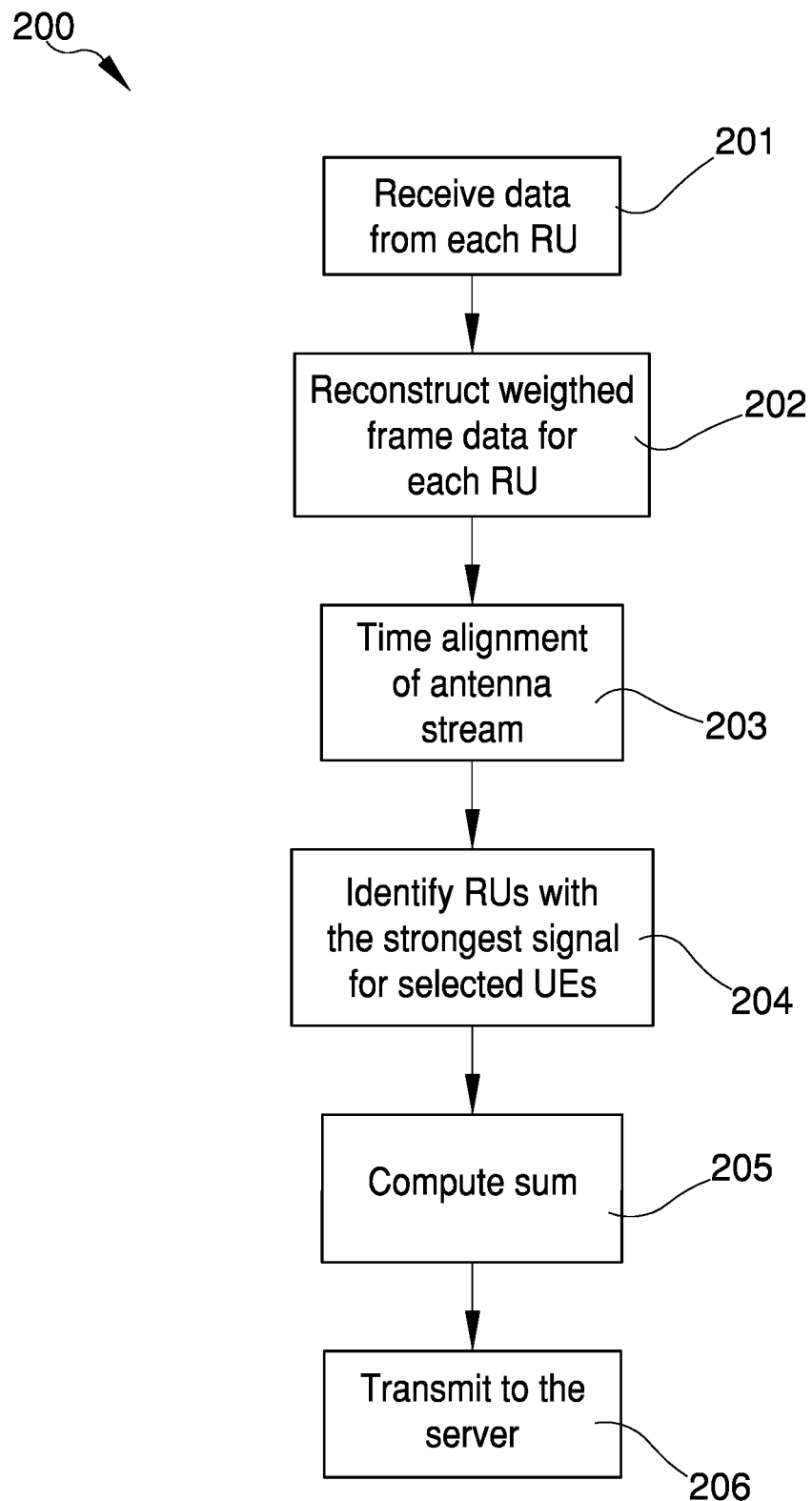
FIG. 7 is a block diagram showing a possible embodiment of the method according to the invention for generating a plurality of summed weighted frequency domain data sets.

Preferably, the timestamp is a tag associated to each frequency and time data set. The method 200 for generating a plurality of summed weighted frequency domain data sets starting from a plurality of weighted frequency domain data sets is detailed below and a possible embodiment is showed in FIG. 7.

Preferably, the method 200 disclosed below is achieved for the uplink signal and by the intelligent switching unit 6 of the wireless communication system 1 according to the invention. However, different embodiment are not excluded wherein the totality or at least part of the steps are executed by the baseband processing unit 3. Therefore, the intelligent switching unit 6 (and all its functionality) can be integrated into the baseband processing unit 3.

The method 200 comprises at least the following steps:
- receiving a plurality of weighted frequency domain data sets from a plurality of remote units 2 (step 201), wherein each of the weighted frequency domain data sets is from a respective remote unit 2, and wherein each of the weighted frequency domain data sets has a plurality of weighted samples;
- temporally aligning each of the weighted frequency domain data sets to generate a plurality of aligned weighted frequency domain data sets (step 203);
- computing a sum of the plurality of aligned weighted time and frequency samples to generate a plurality of summed weighted frequency domain data sets (step 205); and
- transmitting the plurality of summed weighted time and frequency samples (step 206).

Particularly, the step 205 of computing the sum of the plurality of weighted frequency domain data sets comprises computing a sum of in-phase and quadrature components of each of the weighted samples.

Furthermore, following the sum 205, the method 200 comprises:
- comparing an amplitude of each weighted sample with a sum threshold value; and
- removing from the plurality of weighted frequency domain data sets those samples that have an amplitude that is below the sum threshold value.

Furthermore, the method 200 comprises:
- the identification of a user-equipment specific plurality of weighted samples within the plurality of aligned weighted frequency domain data sets, wherein the user-equipment specific plurality of weighted samples corresponds to a specific user equipment as received from each of the remote units;
- the identification of a specific remote unit corresponding to a specific weighted frequency domain data set, within the plurality of aligned weighted frequency domain data sets for which its UE-specific plurality of weighted samples has a highest corresponding coefficient value (step 204).

The method 200 further comprises at step 206 the transmission of a remote unit identifier corresponding to the specific remote unit and a user-equipment identifier corresponding to the specific user equipment.

Particularly, according to a possible embodiment, the method 200 comprises:

receiving a time stamp corresponding to the UE-specific plurality of weighted samples corresponding to each of the remote units 2; and calculating a time difference of arrival using each of the time stamps.

The different timestamps or time difference of arrival (TDoA) are useful to determine the location of a specific user equipment. Location techniques based on received signal ToA or TDoA can all be suitable.

According to a possible embodiment, all user-equipment related information that is available, including time stamps, TDoA, AoA, RSSI, etc., is forwarded to the baseband processing unit 3 in transmission step 205.

Furthermore, the user-equipment identifier and the remote unit identifier are stored for selective routing of downlink data intended for the specific user equipment to the specific remote unit 2.

Furthermore, according to the method 200, temporally aligning each of the weighted frequency domain data sets comprises matching weighted samples with corresponding time-stamps across the plurality of weighted frequency domain data sets.

Figure 8:
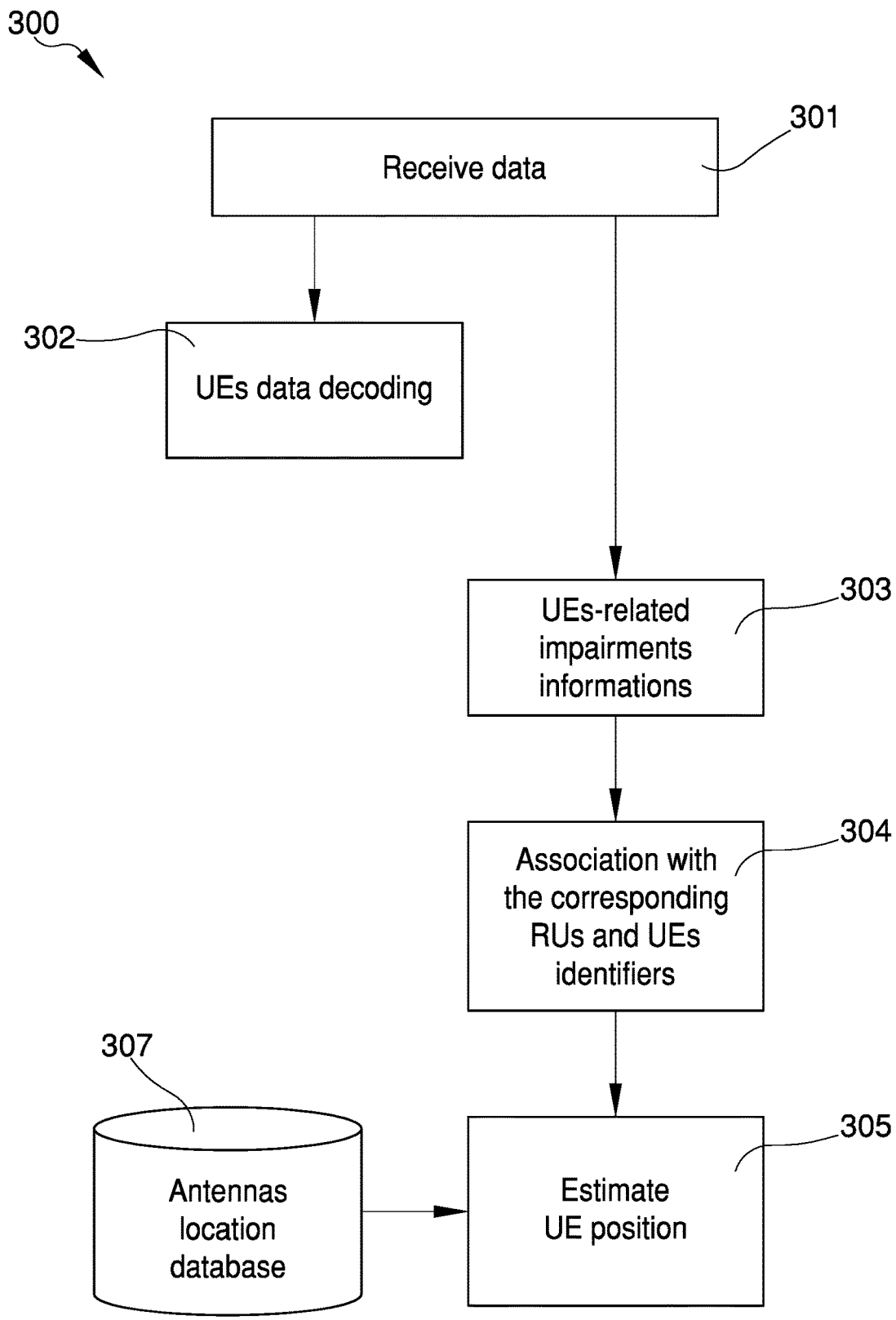
FIG. 8 is a block diagram showing a possible embodiment the method according to the invention for processing summed weighted frequency domain data sets.

The method 300 for processing the summed weighted time or frequency domain data sets is detailed below and a possible embodiment is shown in FIG. 8.

Preferably, the method 300 disclosed below is achieved for the uplink signal and by the baseband processing unit 3.

The method 300, at step 301, comprises:
receiving a plurality of summed weighted frequency domain data sets (302);
receiving a plurality of user equipment related and/or signal information including time stamps, TDoA, AoA, RSSI, etc., estimated in step 106 (303);
receiving a remote unit identifier corresponding to a specific remote unit and a user-equipment identifier corresponding to a specific user equipment.

Furthermore, the method 300 comprises a step 304 of associating the received user-equipment related and/or signal information with the corresponding remote units 2 and user equipment's identifiers;

Subsequently, the method 300 comprises the step 305 of estimating the user equipment's position exploiting at least one of the techniques based on received signal ToA, TDoA, RSSI, AoA, super-resolution algorithms (SAGE, RiMAX, etc.), or any suitable radiolocation technique.

Furthermore, the method 300 comprises performing a remaining portion of a baseband processing protocol on the plurality of summed weighted time or frequency domain data sets.

Eventually, the baseband unit 3 can exploit the antenna position database 307 to map the user equipment in the environment. This database is either given or can be filled during the installation phase.

In a particular embodiment, the user equipment location can be performed in a remote/cloud platform either sending all the user equipment related information and estimations previously performed or not.

According to a possible embodiment, the remaining portion of the baseband processing protocol comprises an Inverse Fast Fourier Transform step in an LTE Layer 1 process.

Furthermore, the method 300, at step 301, comprises receiving at least one of the following:
a phase shift data corresponding to the user-equipment specific plurality of summed weighted frequency domain data sets;
a frequency shift data corresponding to the user equipment specific plurality of summed weighted frequency domain data sets; and
a time delay data corresponding to the user-equipment specific plurality of summed weighted frequency domain data sets.

Furthermore, the method for processing downlink data in a wireless communications network comprises:
receiving a plurality of downlink data intended for a specific user equipment;
identifying a closest remote unit that corresponds to a strongest uplink signal within a plurality of remote units, wherein the identifying includes retrieving a user-equipment identifier from the downlink data, and retrieving a remote unit identifier corresponding to the strongest weighted uplink signal; and
routing the downlink data exclusively to the closest remote unit.

In practice it has been observed that the described invention achieves the intended purposes.

Particularly, the wireless communication system and the related method for processing uplink fronthaul data can be used in small-medium sized buildings and mini metropolitan areas as an alternative to small-cell solutions.

The invention claimed is:

1. A wireless communications system, comprising:
a plurality of remote units, wherein each remote unit is configured to convert a respective RF signal into a plurality of time and frequency samples, perform a noise estimation corresponding to the plurality of time and frequency samples, compute a plurality of coefficients corresponding to the plurality of time and frequency samples that have an amplitude greater than at least a predefined threshold value, and multiply each of the plurality of coefficients by its corresponding time and frequency sample of the plurality of time and frequency samples to create a plurality of weighted time and frequency samples;
at least an intelligent switching unit, coupled to the plurality of remote units, wherein the intelligent switching unit is configured to receive the plurality of weighted time and frequency samples from each of the plurality of remote units, temporally align the plurality of weighted time and frequency samples, compute a set of weighted sums of time and frequency samples and transmit the set of weighted sums of time and frequency samples; and
a baseband processing unit coupled to the intelligent switching unit and configured to receive the set of weighted sums of time and frequency samples, and compute a remaining portion of baseband protocol stack processing on the set of weighted sums of time and frequency samples,
wherein, said intelligent switching unit is configured for executing at least the following steps:
receiving a plurality of weighted frequency domain data sets from the plurality of remote units, wherein each of the weighted frequency domain data sets is from a respective remote unit, and wherein each of the weighted frequency domain data sets has a plurality of weighted samples;
temporally aligning each of the weighted frequency domain data sets to generate a plurality of aligned weighted frequency domain data sets;
computing a sum of the plurality of aligned weighted frequency domain data set to generate a plurality of summed weighted frequency domain data sets; and transmitting the plurality of summed weighted frequency domain data sets, and wherein said baseband processing unit is configured for executing at least the following steps:
receiving a plurality of summed weighted frequency domain data sets;
receiving a remote unit identifier corresponding to a specific remote unit and a user-equipment identifier corresponding to a specific user equipment; and
performing a remaining portion of a baseband processing protocol on the plurality of summed weighted frequency domain data sets.

2. The wireless communications system according to claim 1, further comprising at least a first Ethernet connection connecting said plurality of remote units and said intelligent switching unit, and at least a second Ethernet connection connecting said intelligent switching unit and said baseband processing unit.

3. The wireless communications system according to claim 2, further comprising at least one of: (i) at least a first Ethernet switch disposed between said plurality of remote units and said intelligent switching unit and (ii) at least a second Ethernet switch disposed between said intelligent switching unit and the baseband processing unit.

4. The wireless communications system according to claim 1, further comprising a plurality of intelligent switching units, wherein each of the plurality of intelligent switching units is coupled to a respective plurality of remote units.

5. The wireless communications system according to claim 2, wherein said intelligent switching unit is further configured to transmit a Power over Ethernet (PoE) signal to each of the plurality of remote units.

6. The wireless communications system according to claim 1, wherein each remote unit within at least one of: (i) said plurality of remote units and (ii) said intelligent switching unit is configured to calculate at least one of the following:
a phase shift corresponding to each of said plurality of time and frequency samples;
a frequency shift corresponding to each of said plurality of time and frequency samples; and
a time delay corresponding to each of said plurality of time and frequency samples.

7. The wireless communications system according to claim 1, wherein each remote unit within said plurality of remote units is further configured to provide a time stamp corresponding to its plurality of time and frequency samples.

8. The wireless communications system according to claim 1, wherein said intelligent switching unit is configured to configure said plurality of remote units to set a bias threshold for each of the plurality of remote units, thereby prioritizing said plurality of weighted time and frequency samples from one or more prioritized remote units.

9. A method for processing uplink fronthaul data, comprising at least the following steps:
receiving an RF signal;
digitizing the RF signal into a plurality of frequency domain data sets, each of the frequency domain data sets having a plurality of samples;
calculating a noise estimation corresponding to the plurality of frequency domain data sets;
comparing an amplitude corresponding to each sample to a threshold value;
calculating a coefficient corresponding to each sample that has an amplitude that is greater than the threshold value;
multiplying each sample that has an amplitude that is greater than the threshold value by its corresponding coefficient to create a plurality of weighted frequency domain data sets having a plurality of weighted samples;
transmitting each plurality of weighted frequency domain data sets;
receiving the plurality of weighted frequency domain data sets from a plurality of remote units, wherein each of the plurality of weighted frequency domain data sets is from a respective remote unit, and wherein each of the plurality of weighted frequency domain data sets has a plurality of weighted samples;
temporally aligning each of the weighted frequency domain data sets to generate a plurality of aligned weighted frequency domain data sets;
computing a sum of the plurality of aligned weighted frequency domain data sets to generate a plurality of summed weighted frequency domain data sets;
transmitting the plurality of summed weighted frequency domain data sets;
receiving a plurality of summed weighted frequency domain data sets;
receiving a remote unit identifier corresponding to a specific remote unit and a user-equipment identifier corresponding to a specific user equipment; and
performing a remaining portion of a baseband processing protocol on the plurality of summed weighted frequency domain data sets.

10. The method according to claim 9, wherein said step of digitizing the RF signal comprises sampling and quantizing an uplink carrier signal into a digital data stream.

11. The method according to claim 9, wherein said step of calculating the noise estimation comprises:
measuring a noise level corresponding to a portion of spectrum in close proximity to an uplink carrier signal corresponding to the RF signal, whereby in the portion of spectrum in close proximity has substantially only noise present; and
performing a data aided noise estimation after performing a partial demodulation of the uplink carrier signal.

12. The method according to claim 9, comprising at least a step of calculating the threshold value as a function of the noise estimation and a minimum acceptable signal to noise ratio.

13. The method according to claim 9, wherein said step of calculating the coefficient comprises setting the coefficient to a constant value.

14. The method according to claim 9, further comprising calculating at least one of the following:
a phase shift estimation corresponding to each of a second plurality of samples within the plurality of weighted frequency domain data sets;
a frequency shift estimation corresponding to each of the second plurality of samples; and
a time delay, within a period of the plurality of frequency domain data sets, corresponding to each of a second plurality of samples.

15. The method according to claim 14, wherein said step of transmitting each weighted frequency domain data set includes transmitting the phase shift estimation, the frequency shift estimation, and the time delay.

16. The method according to claim 9, further comprising a step of storing a time stamp for each data set corresponding to the period during which contained samples have been received, and in that said step of transmitting each weighted frequency domain data set includes transmitting said time stamp.

17. A method for processing uplink fronthaul data in a wireless communications network, comprising:
- receiving a plurality of weighted frequency domain data sets from a plurality of remote units, wherein each of the weighted frequency domain data sets is from a respective remote unit, and wherein each of the weighted frequency domain data sets has a plurality of weighted samples;
- temporally aligning each of the weighted frequency domain data sets to generate a plurality of aligned weighted frequency domain data sets;
- computing a sum of the plurality of aligned weighted frequency domain data sets to generate a plurality of summed weighted frequency domain data sets;
- transmitting the plurality of summed weighted frequency domain data sets,
- receiving a plurality of summed weighted frequency domain data sets;
- receiving a remote unit identifier corresponding to a specific remote unit and a user-equipment identifier corresponding to a specific user equipment; and
- performing a remaining portion of a baseband processing protocol on the plurality of summed weighted frequency domain data sets.

18. The method according to claim 17, comprising:
- comparing an amplitude of each weighted sample with a sum threshold value; and
- removing from the plurality of weighted frequency domain data sets those samples that have an amplitude that is below the sum threshold value.

* * * * *